Patented Mar. 19, 1940

2,194,450

UNITED STATES PATENT OFFICE 2,194,450

DIMER OF 1,4-DIHYDRONAPHTHALENE

Norman D. Scott, Sanborn, and Joseph Frederic Walker, Niagara Falls, N. Y., assignors to E. I. du Pont de Nemours & Company, Wilmington, Del., a corporation of Delaware No Drawing. Original application July 25, 1934, Serial No. 736,960. Divided and this application August 17, 1937, Serial No. 159,560

3 Claims. (Cl. 260—666)

This invention relates to the manufacture of hydrogenated products made from naphthalene or the homologs of naphthalene and particularly to the manufacture of dihydro naphthalene and its homologs and polymers of these dihydro compounds. This application is a division of our copending application S. N. 736,960, filed July 25, 1934.

The reduction of naphthalene by sodium and alcohol has long been known. Although it is stated in the literature that the reduction can be controlled to give dihydronaphthalene rather than tetralin by working at moderate temperatures, the process has never attained practical importance. Presumably this is largely due to its inefficiency and the tendency to waste hydrogen. In connection with his work on lithium naphthalene reactions, the separation of dihydronaphthalene was reported by Schlenk (Annalen 463 p. 91). He decomposed with alcohol the addition compound of lithium and naphthalene which had been prepared in ethyl ether as solvent with a reaction time of eight days. Both the slowness of this process and the expense of lithium make this method impractical. Schlenk reports that in experiments of shorter duration for the reaction of lithium with naphthalene he obtained after alcoholysis an equimolar mixture of naphthalene and dihydronaphthalene.

An object of this invention is to provide an improved method for the preparation of dihydronaphthalene and its homologs with efficient utilization both of alkali metal and of the hydrocarbon being reduced. A further object is to provide means of completing the reaction in a short time. A further object is to control the reaction so that the dihydronaphthalene or its homologs can be obtained at will, either unpolymerized, or polymerized to resinous substances. Other objects will appear from the following description of our invention.

We have discovered that dihydronaphthalene and its homologs tend to react with solutions of alkali metal compounds of naphthalene and its homologs to form polymeric alkali metal compounds which on hydrolysis are converted to resinous polymers. We have further found that this reaction between the dihydro compound and the alkali metal compound is profoundly influenced by relatively small temperature changes. At low temperatures, the reaction is greatly inhibited; or, if the temperature is sufficiently low, it is substantially completely prevented. For example, the reaction between dihydronaphthalene and disodium naphthalene occurs readily at temperatures of 25° C. and higher, but as the temperature is decreased below 25° C., the reaction is progressively inhibited and at temperatures around −30° C. the reaction is not appreciable within a reasonable length of time. In the case of the homologs of dihydronaphthalene, for example, dihydro alpha methylnaphthalene or dihydro beta methylnaphthalene, the same temperature influence may be observed although the critical temperature may vary somewhat.

By proper application of these discoveries, in accordance with our invention, we are able to prepare dihydronaphthalene or its homologs in higher yields than heretofore has been possible in experiments of reasonable duration. Furthermore, we are able to modify the process in such manner that the reaction produces small amounts of the dihydro compound, most of the hydrocarbon being converted to a useful resinous material which apparently is a polymer of the dihydro compound.

One possible reason for the low yield of dihydronaphthalene obtained by prior methods is based upon the fact that ordinarily not more than one gram atom of alkali metal will react with one gram molecule of naphthalene in reasonable time, e. g., several hours. This proportion of reacted metal is equivalent to the formation of one mole of dimetal naphthalene, leaving one mole of naphthalene unreacted. When the reaction mixture is hydrolyzed, the resulting hydrolysis product theoretically is an equimolecular mixture of naphthalene and dihydronaphthalene. As explained more fully below, by means of our invention, we are able to convert 90% or more of naphthalene or a naphthalene homolog to the corresponding dihydro compound in a single operation. The product can be analyzed by titrating with solutions of bromine in chloroform at 0° C. Each molecule of dihydronaphthalene absorbs one molecule of bromine without liberation of HBr.

In preparing the dihydro compounds of naphthalene and its homologs and the polymers of the dihydro compounds, we use sodium in preference to other alkali metals mainly because of its cheapness and availability. By way of illustration, our invention will be described with reference to the use of sodium as the alkali metal component of the reactions involved.

In order to obtain a sodium-naphthalene compound within a reasonable length of time, it is necessary to adopt special methods. A satisfactory method for reacting sodium with naphthalene and similar hydrocarbons is described and claimed in the co-pending application of Norman D. Scott, Serial Numbers 638,524, 691,574 and 678,261. Briefly stated this method comprises reacting the hydrocarbons with sodium in a solvent medium comprising substantial amounts of certain "active" ethers. The ethers which are used for this purpose are substantially inert to sodium and to the sodium hydrocarbon compound which is formed in the reaction and may be divided into two classes as follows:

1. Dialkyl mono-ethers having a $CH_3O$ group and in which the atomic ratio of oxygen to carbon is not less than 1:4. Examples in this group are dimethyl ether and methylethyl ether.

2. Poly-ethers, that is, ethers having more than one ether oxygen linkage, for example the fully alkylated derivatives of ethylene glycol or glycerol.

These ethers may be used as solvent medium either alone or mixed with other inert solvents such as paraffin hydrocarbons, aromatic hydrocarbons or inert ethers which do not fall within the above mentioned classes. In order to react the hydrocarbon with sodium in these ether solvents, the hydrocarbon is dissolved in the solvent and the sodium is added to the solution. Preferably, the reaction is carried out under an atmosphere of inert gas, e. g., nitrogen. The surface of the alkali metal should be free from coatings of oxide or carbonate, which tend to inhibit the reaction.

By way of illustration, certain methods of preparing hydrogenated derivatives of naphthalene in accordance with our invention will be described.

*Preparation of dihydronaphthalene*

In accordance with our invention, dihydronaphthalene is prepared by first reacting naphthalene with an alkali metal, for example sodium, to form a sodium naphthalene addition product and subsequently hydrolyzing the sodium naphthalene compound, while taking measures to inhibit the above mentioned reaction of sodium naphthalene with the dihydronaphthalene which is formed by the hydrolysis. In accordance with our invention, two methods may be used to inhibit the reaction between the dihydronaphthalene and the sodium naphthalene compound, namely, by (a) carrying out the hydrolysis at a temperature at which the reaction between the sodium compound and the dihydronaphthalene is inhibited, that is, at a temperature below 25° C., preferably at a temperature around −30° C.; and (b) by hydrolyzing the sodium compound substantially as fast as it is formed and in such manner that no substantial amount of sodium compound is allowed to accumulate in the reaction mixture. The second method may be carried out at temperatures in which the sodium compound and the dihydronaphthalene readily react, for example 25 to 30° C.

In one method of practicing our invention, naphthalene is dissolved in a suitable ether solvent, that is one of the "active" ethers described above, for example the dimethyl ether of ethylene glycol, in a vessel equipped with a mechanical stirrer and provided with means for maintaining an atmosphere of nitrogen or other inert gas in the reaction vessel. Approximately 2 gram atoms of sodium for each gram molecule of naphthalene in the solution is placed in a perforated container which is suspended in the solution. During the resulting reaction between the sodium and the naphthalene, the reaction vessel is cooled by means of a cooling bath which may consist of a hydrocarbon such as kerosene to which is added solidified carbon dioxide as required to maintain the desired temperature. The reaction mixture is constantly stirred and the temperature therein is maintained at −20 to −30° C. As the reaction proceeds, the solution takes on a green color due to the formation of the sodium naphthalene compound. At any time after the green color has formed, a hydrolyzing agent, for example water, is added either continuously or intermittently with continuous stirring and cooling so that the reaction temperature does not rise above −20° C. The hydrolysis reaction is exothermic; hence the rate of addition of water must be so adjusted as to prevent undue rise in temperature. If sufficient water is first added to the reaction mixture, the green color may disappear, due to the conversion of the sodium naphthalene compound to dihydronaphthalene. However, in a short time the solution will be again colored green, indicating that as the sodium naphthalene compound is hydrolyzed, the remaining naphthalene continues to react with the sodium. As the reaction between the naphthalene and sodium proceeds, the hydrolyzing agent is added in small amounts continuously or from time to time until substantially all the sodium has reacted. Preferably, a slight excess of the hydrolyzing agent is added. The sodium hydroxide formed by the hydrolysis, being insoluble in the solvent ether, forms a precipitate. The solution is filtered to remove the sodium hydroxide and the filtrate is distilled to separate the dihydronaphthalene from the reaction mixture. Preferably, the hydrolyzed solution is saturated with carbon dioxide prior to filtration to convert the sodium hydroxide to bicarbonate, which generally is easier to filter out than sodium hydroxide. If the filtrate is distilled at atmospheric pressure, the dihydronaphthalene distills over at 205 to 210° C. If desired, the dihydronaphthalene fraction may be further purified or separated into its isomers by known means.

In another method of preparing dihydronaphthalene by our invention, naphthalene is dissolved in a suitable "active" ether having a boiling point above room temperature for example, the dimethyl ether of ethylene glycol, and reacted with sodium at room temperature under an atmosphere of nitrogen. As soon as the reaction between the sodium and the naphthalene has commenced as indicated by the formation of a green color around the sodium, the hydrolyzing agent, preferably water, is slowly added to the solution, either continuously or intermittently. As the reaction proceeds, care is taken that the rate of addition of water is sufficient to prevent the spread of the green color throughout the solution but is not great enough to prevent the formation of green color on the surface of the sodium or in close proximity thereto. Preferably, the addition of water is carried out in such manner that the sodium particles are covered with a film of the green sodium naphthalene compound but the reaction mixture is substantially free from the green compound. If the water is added too rapidly it is likely to react with the sodium which will be indicated by the formation of a coating of white sodium oxide on the sodium particles. The dihydronaphthalene is recovered from the reaction mixture by the method described above.

The dihydronaphthalene made according to our invention appears to be an isomeric mixture which is chiefly 1,4-dihydronaphthalene; it melts at a temperature between 20 and 25° C. and has a boiling point of around 210 C. at atmospheric pressure. Bromination of this product gives a substance which after purification by crystallization from methanol has a melting point of 71–71.6° C. which corresponds fairly closely with the melting point of the dibromo derivative of 1:4 dihydronaphthalene.

*Preparation of dihydronaphthalene polymer*

Dihydronaphthalene polymer may be prepared according to our invention by reacting dihydronaphthalene with the above described green sodium naphthalene compound.

In order that this reaction may proceed within a reasonable length of time, the temperature of the reaction mixture should be not lower than about 20° C. and preferably not higher than around 30° C. At the higher temperatures, that is, above 30° C., the polymer may be prepared but the degree of polymerization is ordinarily somewhat lowered and the product tends to be colored. If the polymerization occurs at temperatures between 25 and 30° C. good yields of a highly polymerized, substantially colorless, resinous polymer having a melting point around 100° C. may be obtained. At temperatures much below 20° C., the reaction between dihydronaphthalene and the sodium compound is slow and the yield is low. However, fair yields of the polymer may be obtained at temperatures as low as 15° C. The reaction may be carried out by first preparing substantially pure dihydronaphthalene and adding this to the green sodium naphthalene compound dissolved in one of the aforementioned "active" ethers or the polymerization may be effected by hydrolyzing a mixture of naphthalene and sodium naphthalene produced by reacting sodium with naphthalene in a suitable "active" ether solvent.

By way of illustration, one method of preparing a dihydronaphthalene polymer of high molecular weight according to our invention will be described. Sodium is reacted with a solution of naphthalene dissolved in the dimethyl ether of ethylene glycol under an atmosphere of nitrogen, the reaction being carried out at 25 to 30° C. When the reaction has proceeded to the extent that the green color of the sodium naphthalene has substantially entirely permeated the reaction mixture, water is slowly added to the reaction mixture with continuous agitation and sufficient cooling to prevent the temperature of the reaction mixture from rising substantially above 30° C. As the reaction proceeds, water is added either continuously or intermittently at such rate that the green color of the sodium naphthalene compound is never discharged. When the reaction is complete, the reaction mixture is filtered to remove the precipitated sodium hydroxide and the filtrate is distilled to remove solvent and reacted by-products, leaving the dihydronaphthalene polymer as the distillation residue. Preferably, we first distill at atmospheric pressure to remove the solvent ether and then distill in vacuum at a pressure of 1 to 8 millimeters of mercury until the distillation of volatile material is completed. On cooling, the liquid residue solidifies to a slightly fluorescent, resinous material which melts in the neighborhood of 100° C. If the process has been carried out without undue rises in temperature, the solid resinous polymer will be substantially colorless. Slightly impure samples of this material usually have a light yellow color.

In the above described method of preparing the dihydronaphthalene polymer, more or less of a dimer of dihydronaphthalene is formed which is removed during the final distillation. The resulting product, when this dimer is practically completely removed, has a molecular weight of 400 or higher and a melting point of about 97–103° C. If desired, the purification step may be modified so as to allow all or part of the dimer formed to remain in the final product, thus resulting in a product having a lower molecular weight and a lower melting point. We prefer, however, to remove all or the greater part of the dimer in order to produce the high molecular weight product which has useful resinous properties. The high molecular weight product has a refractive index of approximately 1.60 and a density of about 1.0.

The above mentioned dimer of dihydronaphthalene, which is provided in the distillation step, is obtained in its crude state as a viscous liquid, distilling over at 200 to 230° C. at a pressure of 1 to 3 mm. of mercury. This is probably the dimer, contaminated with some dihydronaphthalene and small amounts of higher polymers, e. g., the trimer. A fraction distilling at 210 to 225° C. at 1 to 3 mm. of mercury has a molecular weight close to 260, and hence is regarded as almost pure dimer. Other fractions, distilling at 200 to 230° C. have molecular weights varying from 250 to 320. The dimer, depending upon its degree of purity, has a pour point of 10 to 15° C. and solidifies to a hard, brittle resin at —10 to 0° C. At room temperature it is a viscous liquid, which is practically colorless with a slight blue fluorescence when pure; slightly impure samples ordinarily have a light yellow color. The solubilities of the dimer resemble those of the higher polymers of dihydronaphthalene as described below, i. e., it is soluble in hydrocarbons, chlorinated hydrocarbons, ketones and esters but is insoluble in water or alcohols. Both the dimer and the solid polymer are decomposed when heated to 350 to 400° C. A small amount of the dimer is sometimes formed in the herein described preparation of dihydronaphthalene. The corresponding dimers of naphthalene homologs may be made by our method; these have properties similar to those of the dihydronaphthalene dimer.

The dimer of dihydronaphthalene has a boiling point of about 200° C. under a pressure of one millimeter and has a refractive index of about 1.6 at 24° C.

If desired, the dimer of dihydronaphthalene may be further polymerized to the resinous polymers having molecular weights of 400 or higher by reacting the dimer with the sodium naphthalene compound under the same conditions that are required for the reaction with dihydronaphthalene and subsequently hydrolyzing.

The dihydronaphthalene polymer, whether prepared so as to contain dimer or free from dimer, is readily soluble in aromatic hydrocarbons, for example, toluene and benzene, in aliphatic hydrocarbons, for example gasoline, in chlorinated hydrocarbons, for example carbon tetrachloride, in aliphatic ketones, for example acetone, in fatty acid esters, for example ethyl acetate, and in the various ethers, including those which are suitable for making disodium naphthalene as described above, and in turpentine. It is insoluble in water and in alcohols and may be precipitated from its solutions by the addition of these substances.

We have discovered that acenaphthene reacts with sodium like the naphthalene homologs. That is, acenaphthene, dissolved in one of the aforementioned "active" ethers will react with sodium to form a sodium compound which may be hydrolyzed in accordance with our herein described invention to produce dihydro acenaphthene, its liquid dimer and its higher, solid polymers. The sodium compound of acenaphthene reacts with dihydro acenaphthene or its dimer in the same manner that sodium naphthalene reacts with dihydronaphthalene or its dimer.

In preparing solid polymers by our methods, complex products may be made by utilizing two or more different hydrocarbons. For example, sodium naphthalene may be reacted with dihydro acenaphthene. This method of practicing our invention may be accomplished either by starting with a mixture of hydrocarbons, e. g., a mixture of naphthalene and acenaphthene, or the respective sodium compound and dihydro compound may be prepared separately and then reacted.

Example 1

A quantity of sodium was finely divided by agitating at a temperature above its melting point in xylene. The xylene was washed from the pulverized sodium by means of dimethyl ether and 15 grams of the sodium was placed in a reaction vessel with 200 cc. of liquid dimethyl ether. Thirty-two grams of naphthalene were added to the reaction vessel and the materials were allowed to react under an atmosphere of dry, oxygen-free nitrogen for a period of one hour at the boiling point of the dimethyl ether, that is, at about $-24°$ C. During the reaction, a green color was formed indicating the formation of the sodium naphthalene compound. After the reaction was completed, an excess of methanol was slowly added with agitation to completely decolorize the reaction mixture, while the temperature was maintained at about $-24°$ C. The dimethyl ether then was evaporated off and the residue was dissolved in diethyl ether. The diethyl ether solution was washed with water to remove sodium alcoholates and the resulting ether solution was heated on a steam bath to evaporate off the diethyl ether and excess methanol. The remaining residue was fractionally distilled under a pressure of approximately 55 millimeters of mercury. The distillate, which corresponded to about 80% of the naphthalene originally taken, distilled over at 70–150° C. It was collected in three fractions, as follows:

| Fraction | Boiling range | Melting point | Percent yield |
|---|---|---|---|
|  | ° C. | ° C. |  |
| 1 | 70 to 114 | 0 to 8 | 26 |
| 2 | 114 to 115 | 20 to 23 | 46 |
| 3 | 115 to 150 | 7 | 8 |
| Total yield |  |  | 80 |

Fractions 1 and 2 were mainly dihydronaphthalene; 1,2-dihydronaphthalene melts at $-8°$ C. and the 1,4-isomer melts at 25° C.

Example 2

Naphthalene (256 grams) dissolved in 1.5 liters of dimethyl glycol ether was reacted with one gram atom of sodium per mole of naphthalene under an atmosphere of nitrogen at room temperature. When the reaction was complete, the resulting green solution of sodium naphthalene was very slowly added to a quantity of dimethylglycol ether which contained a little water. During the addition of the green solution water was slowly added to the dimethyl glycol ether and the additions of the green solution and water were made at such rates that the green color of the sodium naphthalene solution was discharged substantially instantaneously upon its introduction into the moist solvent. After filtration to remove the sodium hydroxide formed, the solvent was evaporated off and the residue fractionally distilled under vacuum. The product obtained was a substantially equimolecular mixture of naphthalene and dihydronaphthalene, corresponding to 84% of the naphthalene originally taken.

Example 3

Nahthalene was reacted with sodium under an atmosphere of nitrogen in a solution of dimethyl glycol ether at a temperature of $-30°$ C. As soon as the green color of the sodium compound was formed, methanol was slowly added at a rate insufficient to completely discharge the green color. After a period of about one hour, the green color disappeared. At this point, the solution was filtered to remove precipitated sodium methylate and the residue was fractionated to separate the reaction product. Of the naphthalene used, about 85% was recovered as a mixture of approximately equal parts by weight of naphthalene and dihydronaphthalene. No polymer or other non-volatile compounds were formed.

Example 4

One mole of naphthalene was reacted under an atmosphere of nitrogen with two moles of sodium in dimethyl glycol ether at 20–50° C. As soon as the reaction started, small amounts of water were continuously added at such rates that the formation of a green color in the solution was prevented, but the reaction of the sodium with the naphthalene was not substantially inhibited. By this method, 77% of the original naphthalene was converted into dihydronaphthalene.

Example 5

One mole of naphthalene was reacted under an atmosphere of nitrogen with one gram atom of sodium in diethyl glycol ether at room temperature. After the reaction was complete, sufficient water was added to decolorize the solution and the resulting mixture was filtered to remove precipitated sodium hydroxide. The filtrate was then reacted under an atmosphere of nitrogen with a further gram atom of sodium and the resulting mixture was hydrolyzed and filtered as before. The filtrate from the second reaction was reacted with a further quantity of sodium and hydrolyzed and filtered as above. The final product was distilled under a pressure of 1 to 3 millimeters until substantially all volatile materials were distilled over. The residue which was equivalent to 85% of the naphthalene originally taken, was a substantially colorless, transparent, slightly fluorescent solid, melting at about 100° C.

Example 6

An equimolecular mixture of naphthalene and dihydronaphthalene (575 grams) was dissolved in 500 c. c. of dimethyl glycol ether and reacted with 44 grams of sodium under an atmosphere of nitrogen. The reaction mixture was agitated at room temperature for about six hours, when the reaction appeared to be complete. Sufficient water then was added to decolorize the solution. On fractionation, 290 grams of a practically colorless polymer, similar to the product of Example 5, was obtained. The other products separated from the reaction mixture by the fractionation were 63 grams of the dimer of dihydronaphthalene, a viscous liquid which boils at around 200° C. at 1 mm. of mercury pressure, 123 grams of dihydronaphthalene and 64 grams of naphthalene.

Example 7

About ten grams of the dimer of dihydronaphthalene described in Example 6 was reacted under an atmosphere of nitrogen at room temperature with 10 cc. of a green solution made by reacting sodium with naphthalene in dimethyl glycol ether. The total naphthalene equivalent contained in this green solution, both as free naphthalene and as sodium naphthalene, was 1.5 grams. The dimer and the green solution were mixed with about 50 cc. of dimethyl glycol ether under an atmosphere of nitrogen and reacted at 26–28° C. After decolorization with water and filtration to remove sodium hydroxide, the solvent ether was distilled off and the remaining liquid was distilled at 1–2 millimeters of mercury pressure until substantially all the volatile materials had been distilled off, which required a maximum distillation temperature of about 205° C. On cooling, the residue solidified to a hard transparent resin, similar to the product of Example 6. This resin was found to have a molecular weight of about 419.

Example 8

Forty-eight grams of alpha-methylnaphthalene was reacted in 500 cc. of dimethyl glycol ether with 6 grams of sodium with an atmosphere of nitrogen at room temperature. As the reaction proceeded, water was slowly added at a rate just sufficient to prevent the green color of the sodium alpha methylnaphthalene compound from spreading through the solution. When the sodium had completely reacted, carbon dioxide then was passed through the solution to convert sodium hydroxide to carbonate which was then filtered out. The filtrate was treated by blowing nitrogen through it to remove dissolved carbon dioxide and was then reacted with 6 grams of sodium, allowing the solution to become colored. After this reaction had continued for about 12 hours, water was slowly added to the reaction mixture until the color was discharged. The solution then was treated with carbon dioxide and filtered as before. The solvent ether then was distilled off and the residue was distilled under vacuum. The distillation products consisted of 5 grams of a viscous liquid which was found to have a molecular weight of about 243 and 13 grams of a solid, resinous, non-volatile residue which had a molecular weight of about 401. The lower molecular weight fraction apparently was the dimer of dihydro alpha-methylnaphthalene, while the higher molecular weight product appeared to be the trimer, containing a small amount of the dimer.

Example 9

The procedure of Example 8 was repeated, using beta-methylnaphthalene in place of alpha-methylnaphthalene. In this case, the distillation product consisted of 11 grams of viscous liquid dimer having a molecular weight of about 264 and 7 grams of solid resin having a molecular weight of about 411.

Example 10

Acenaphthene (144 grams) was reacted with 60 grams of sodium at room temperature under an atmosphere of nitrogen in 1200 cc. of dimethyl glycol ether. During the reaction, water was slowly added at such rate that the formation of the green color throughout the solution was prevented but the green color on the surface of the sodium was not prevented. When the sodium had completely reacted, the solution was treated with carbon dioxide to convert sodium hydroxide to the bicarbonate and the solution was filtered. After evaporating off the solvent from the filtrate, the remaining mixture was distilled in vacuum at a pressure of about two millimeters of mercury. A fraction distilling over at 96 to 101° C. (1606 grams) was obtained. This product had a molecular weight of 154 which corresponds closely to the molecular weight of dihydroacenaphthene.

Example 11

Acenaphthene (5 grams) was reacted with sodium in 100 cc. of dimethyl glycol ether at room temperature under an atmosphere of nitrogen. After the reaction had proceeded for one hour, 26 grams of dihydro acenaphthene prepared by the method of Example 10 was added to the solution, which was then allowed to stand for 16–24 hours at room temperature. At the end of this time, water was added to decolorize the solution, carbon dioxide was passed in to convert sodium hydroxide to the carbonate and the solution was filtered. The solvent ether was removed by evaporation and the residual liquid was vacuum distilled. The residue of the vacuum distillation consisted of a resinous material having a molecular weight of about 463. This molecular weight indicated that the resinous product was mainly the trimer of dihydro acenaphthene, contaminated with a small amount of the dimer.

A variety of substances are suitable for use as hydrolyzing agents in practicing our invention. These hydrolyzing agents are those substances which are capable of reacting with sodium to release hydrogen and form sodium compounds. These hydrolyzing agents react with the sodium compounds of naphthalene and naphthalene homologs to replace the sodium with hydrogen; for example, water or alcohol reacts with disodium naphthalene to form dihydronaphthalene and sodium hydroxide or sodium alcoholate respectively. Various types of chemicals having replaceable hydrogen atoms are suitable as hydrolyzing agents in our process; for example, organic hydroxy compounds, e. g. alcohols, amino compounds, those ketones which will react with alkali metals to liberate hydrogen, e. g., dialkyl ketones or alkyl aryl ketones, organic acids, inorganic acids and unsaturated aliphatic hydrocarbons. More specifically, the following have been found to be suitable as hydrolyzing agents: water, methyl alcohol, ethyl alcohol, tertiary butyl alcohol, aniline, acetic acid and acetylene.

When water is used as the hydrolyzing agent in practicing our invention, we have found it advantageous to convert the resulting sodium hydroxide to a salt, e. g., the bicarbonate, before filtration. This is done because there is a tendency for the sodium hydroxide to take up water to form a hydrate which is difficult to filter. Obviously, the sodium hydroxide may be converted into one of various other sodium salts which are insoluble in the reaction medium. Alternately, the sodium hydroxide or other water-soluble hydrolysis by product, e. g., sodium alcoholate, may be removed by washing the reaction mixture with water.

We claim:

1. As a new composition of matter, a liquid polymer of 1,4-dihydronaphthalene having a molecular weight of about 250 to 320.

2. As a new composition of matter, a polymer of 1,4-dihydronaphthalene which is a viscous liquid at room temperature and solidifies on cooling to —10 to 0° C. and which has a molecular weight of about 250 to 320.

3. As a new composition of matter, the dimer of 1,4-dihydronaphthalene.

NORMAN D. SCOTT.
JOSEPH FREDERIC WALKER.